United States Patent [19]

DuBois

[11] Patent Number: 5,234,510
[45] Date of Patent: Aug. 10, 1993

[54] SURFACING NICKEL ALLOY WITH INTERDENDRITIC PHASES

[75] Inventor: Samuel C. DuBois, Troy, Mich.

[73] Assignee: Wall Colmonoy Corporation, Madison Heights, Mich.

[21] Appl. No.: 656,481

[22] Filed: Feb. 15, 1991

[51] Int. Cl.$^5$ ............................................. C22C 19/03
[52] U.S. Cl. .................... 148/426; 75/254; 420/441
[58] Field of Search ................ 420/441; 148/310, 403, 148/409, 426; 75/254

[56] References Cited

U.S. PATENT DOCUMENTS

| | | | |
|---|---|---|---|
| 2,880,086 | 3/1959 | Cape | 420/459 |
| 2,899,302 | 8/1959 | Cape et al. | 420/441 |
| 3,238,060 | 3/1966 | Quaas et al. | 420/459 |
| 3,658,515 | 4/1972 | Saltzman | 420/453 |
| 3,836,341 | 9/1974 | Saltzman et al. | 428/547 |
| 4,079,430 | 3/1978 | Fujishima et al. | 148/304 |
| 4,116,682 | 9/1978 | Polk et al. | 148/304 |
| 4,231,793 | 11/1980 | Kruske et al. | 420/453 |
| 4,379,121 | 5/1983 | McMurray et al. | 420/452 |
| 4,596,282 | 6/1986 | Maddy et al. | 148/592 |
| 4,623,386 | 11/1986 | Hahn et al. | 420/129 |
| 4,731,253 | 3/1988 | DuBois | 420/453 |

FOREIGN PATENT DOCUMENTS

| | | |
|---|---|---|
| 864024 | 1/1953 | Fed. Rep. of Germany . |
| 2829702 | 1/1980 | Fed. Rep. of Germany . |
| 55-82737 | 6/1980 | Japan . |
| 57-185946 | 11/1982 | Japan . |

OTHER PUBLICATIONS

K. Wakasa, M. Yamaki, "High Temperature Oxidation Behavior of Base Elements in Nickel-Base Alloys" Journal of Materials Science 23 (1988), pp. 1459–1463.
Metals Handbook 9(5) 1982 pp. 412–416.
European Search Report, Application No. EP 91 31 0324 (two pages).
COLMONOY® Technical Data Sheet, Wall Colmonoy Corporation, 1988 (4 pages).
NICROBRAZ® Technical Data Sheet, Wall Colmonoy Corporation, 1987 (4 pages).

Primary Examiner—R. Dean
Assistant Examiner—Margery S. Phipps
Attorney, Agent, or Firm—Harness, Dickey & Pierce

[57] ABSTRACT

An improved nickel-boron-silicon surfacing alloy containing an effective amount of phosphorous. Alloys of the present invention comprise: from about 0.20% to about 2.0% boron; from about 1.0% to about 5.0% silicon; and from about 0.5% to about 4.5% phosphorous, and contain a dendritic and two interdendritic phases.

44 Claims, 2 Drawing Sheets

SURFACING NICKEL ALLOY WITH INTERDENDRITIC PHASES

BACKGROUND OF THE INVENTION

The present invention relates to surfacing alloy compositions. More particularly, the present invention relates to hard corrosion resistant surfacing alloys useful in manufacture and repair of wear surfaces of parts used in extremely harsh environments, such as glass mould parts used in the glass making industry.

With costs of raw materials continually rising, there has been increasing emphasis in increasing the longevity of parts prone to wear. This increase in longevity has been successfully accomplished in the past through the use of surfacing alloys to provide increasingly wear resistant parts and also to allow repair of worn surfaces, where cost effective, rather than replace worn parts. Surfacing alloys have been utilized with great success to cost effectively rebuild wear surfaces on parts and to provide superior wear and corrosion resistant surfaces on cheaper base alloys for new parts.

Surfacing alloys have found particularly favorable use in the glass moulding industry, because of the high temperature corrosive environment and cost conscious production requirements. Thus, surfacing alloys such as Colmonoy ® Nos. 4,5,6,21,22,23,24,43,72 and Wallex ® Nos. 40 and 50 available through Wall Colmonoy of Madison Heights, Michigan, have found useful applications under these conditions. While these and other surfacing alloys have found much success in many applications, the increasing competitiveness in the glass industry has presented new challenges for formulating new surfacing alloys with improved wearability and workability.

Nickel-boron-silicon alloys have seen some favorable consideration for use as surfacing alloys. While nickel, silicon and boron alloys have been recognized as being extremely hard and having high temperature corrosion resistance, these alloys have certain drawbacks. Such alloys are extremely hard and thus are somewhat incompatible with normal machining used in manufacture and repair of such parts. Another drawback of such alloys was the formation of boro silicate glass products during application of the alloy. Boro silicate formation is undesirable in a surfacing alloy composition. Additionally, the appearance of such alloys was unsightly. Thus, this has also been a problem for commercialization of such an alloy. Because of these problems such alloys have not found entirely favorable use as surfacing alloys.

SUMMARY OF THE INVENTION

These problems have been solved in the present invention in that a workable high quality nickel-boron-silicon surfacing alloy may be produced by the use of from about 0.5% to about 4.5% phosphorous, in addition to controlling critical ranges and ratios between the nickel, boron and silicon constituents of the alloy. Thus, in accordance with the present invention there is provided a wear resistant surfacing alloy composition which in its nominal composition comprises from about 0.20% to about 2.0% boron; from about 1.0% to about 5.0% silicon; and from about 0.5% to about 4.5% phosphorous, with the balance being nickel.

The constituents of the present invention can be varied in their ratios to produce fileable alloys which may be useful in repair type applications. Such alloys generally have a hardness of from about 13 to about 21 on the Rockwell C scale. Original manufacture service alloys which are machinable can also be produced in hardness ranges of from about 22 to about 33 on the Rockwell C Scale.

Additional understanding of the present invention including further benefits and advantages, will become apparent from the subsequent description of the preferred embodiments and the appended claims taken in conjunction with the accompanying drawings and examples wherein all percentages are percentages by weight unless otherwise indicated.

DESCRIPTION OF THE PREFERRED EMBODIMENTS

Figure 1:
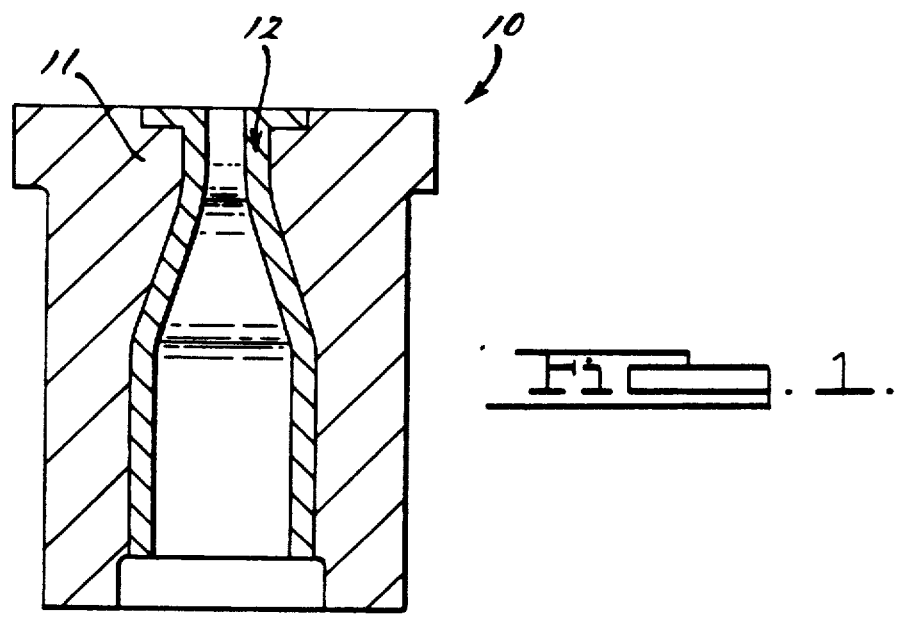
FIG. 1 is a sectional view of a glass mould utilizing a surfacing alloy of the present invention.

In accordance with the broadest aspects of the present invention, the composition of the present invention comprises in its nominal composition: from about 0.2% to about 2.0% boron; from about 1.0% to about 5.0% silicon; from about 0.5% to about 4.5% phosphorous and the balance being nickel. Preferably, compositions of the present invention have in nominal composition of: from about 0.65% to about 1.15% boron; from about 2.0% to about 3.85% silicon; from about 1.8% to about 4.5% phosphorous and the balance being nickel.

As will be readily noted to those skilled in the art the present alloy is a nickel based alloy. The nickel constituent may be obtained from any number of known nickel sources as will be appreciated by those skilled in the art. In the present invention it is preferred that a nickel raw material of pure nickel pellets such as that obtained from INCO International Co. of Saddle Brook, N.J. be utilized. However, other suitable pure nickel raw materials such as those available from Falconbridge Parkans of Houston, Tex. may be used. Additionally, part of the nickel constituent of the present invention may be obtained during the addition of the nickel containing material which includes the boron or phosphorous constituents, during the manufacture process of the present alloy.

The boron constituent of the present invention is primarily incorporated into the alloy by additions of nickel boron during manufacture of the present alloy. The boron constituent acts as a melting point depressent and also a flux in the present composition. Suitable nickel boron compositions include low carbon nickel boron materials obtained from Shield Alloy, S. Holland, Ill. or SKW Metals & Alloys of Niagara Falls, N.Y.

The silicon constituent of the present invention may be incorporated in the present composition by utilization of silicon materials obtained from Elkem Metals Co. of Marietta, Ohio. The silicon constituent of the present alloy composition acts to depress the melting point and adds oxidation resistance to the final surfacing alloy coating of the present invention.

The use of phosphorous in the present invention in the ranges cited is critical to provide the novel surfacing alloys of the present invention. The phosphorous utilized in the present invention may be in the form of a BNi-6 braze material such as a Wall Colmonoy, Nicrobraz ® 10 constituent which includes a nominal composition of 11% phosphorous, a maximum of 0.06% carbon and with the balance being nickel. The phosphorous content of the present invention provides an initial low melt phase to the present alloy composition which improves the property of cold wetting of substrates such as aluminum bronze and cast iron. The phosphorous also acts as a flux in the present invention. The phosphorous is a critical constituent of the present invention in that it substantially eliminates the formation of boro silicates in the final surfacing coating when formed on a substrate. Without wishing to be bound by theory, it is believed that the phosphorous, having a greater affinity for oxygen than either silicon or boron, acts to inhibit the formation of oxides of silicon and boron which are the predecessors of the boro silicates. Thus, by the addition of phosphorous in the ranges recited undesirable boro silicate formation is substantially reduced.

The alloys of the present invention may be formulated in powder form or in rod or ingot form. Suitable coating application systems include the puddle torches such a the Wall Colmonoy Corporation Fusewelder TM type puddle torch or Wall Colmonoy Corporation Spraywelder TM type thermal spray applicators, known in the art, which utilize surfacing alloys in powder form to coat a substrate with a surfacing alloy. Thus, surfacing alloys made in accordance with the teachings of the present invention may be utilized with conventional powder alloy applications technology to provide improved surface coatings on substrate metals.

Whatever the form in which the alloys of the present invention are utilized, the process of manufacture, to provide suitable alloys, is critical in the present invention. In accordance with the process of producing these alloys, there are the following steps. In the first step an initial melt mixture of a nickel and nickel boron is accomplished by first placing one third of the raw nickel composition in a suitable furnace as a first layer. Secondly, the entire amount of nickel boron to be used in the particular alloy, in accordance with the above guidelines, is added to the furnace for covering the first layer. Thereafter, the remaining portion of the raw nickel is utilized to cover and substantially surround the nickel boron layer. The above mixture of material is then melted and alloyed completely. Thereafter, the phosphorous in the form of Nicrobraz ® 10 is added to the molten pool and alloyed. Finally, the addition of silicon to the molten alloy is accomplished. Preferably, the entire melt is heated to a temperature of 2,550° F. prior to pouring or atomizing of the alloy. After melting in this manner the material may be cast into rods or ingots or formed into a powder by utilizing an inert gas rapid solidification atomization nozzle, such as a Krupp 4A nozzle.

Typical particle sizes of the powdered particle form of the present invention range from about 140 mesh to about 400 mesh with preferred sizes being from about 170 mesh to about 325 mesh. A preferred powdered product is a uniform pre-alloyed powder produced in accordance with the aforementioned process which has the following screen analysis: −120 mesh-100%; +140 mesh-trace; 170 mesh-1.5% maximum; +325 mesh-65.0% max; and −325 mesh-35.0% to 45.0% (preferably 40%).

Figure 2:
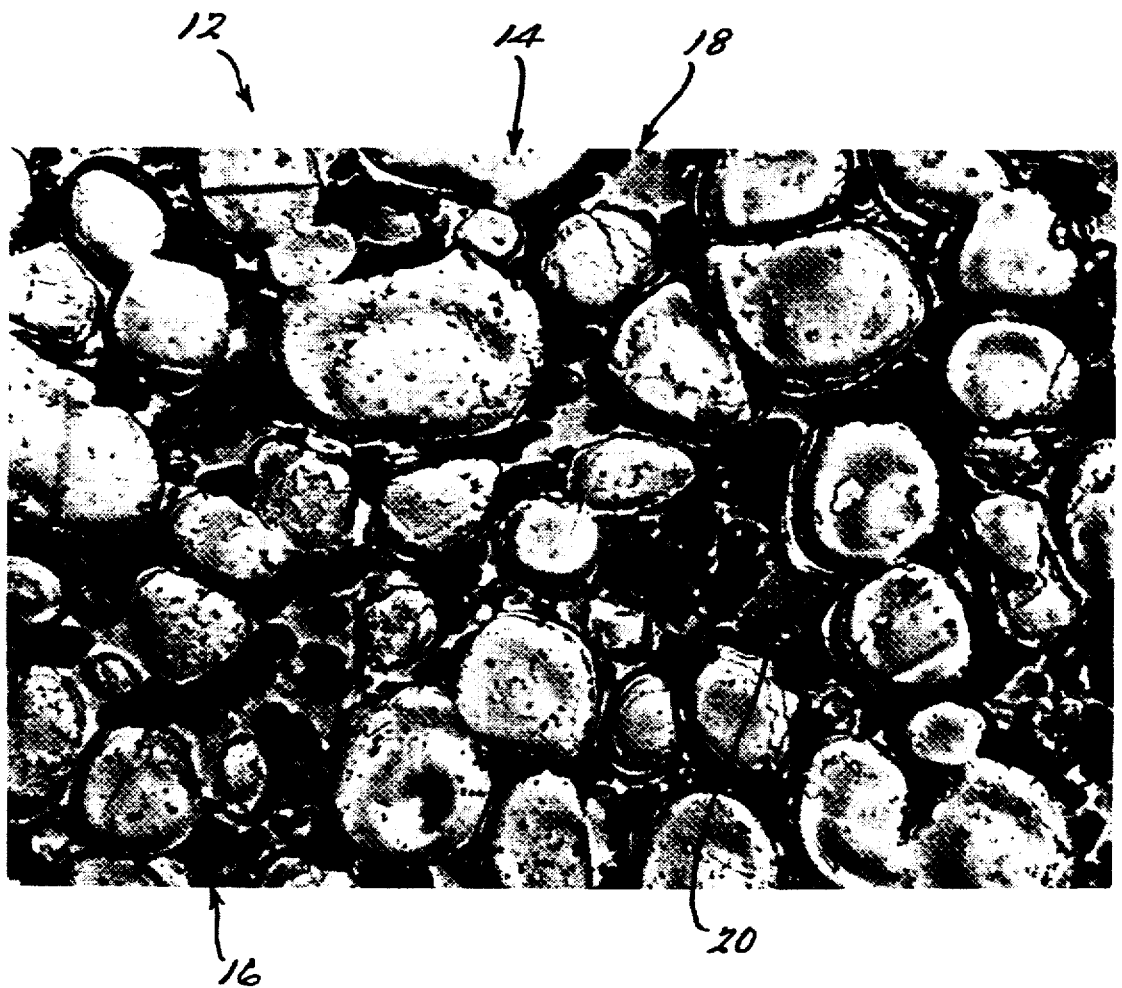
FIG. 2 is a photomicrograph of an alloy of the present invention magnified one thousand times showing the surface qualities of the alloys produced in accordance with the present invention.

While the broad ranges of constituents set forth above are critical to the present invention, adjustments within these ranges, to vary the ratios of the particular constituents, will produce varying hardness surfacing alloys which will retain the same desirable alloyed structure which is shown in FIG. 2 and set forth in more detail below. Such alloys are suitable in one class as a repair surfacing alloy or in another class as an original equipment surfacing alloy. The repair class surfacing alloys are designed such that they readily wet cold substrates and are easy to work by hand files and the like. In the original equipment type surfacing alloys the hardness may be of a greater magnitude since conventional milling equipment may be utilized in shops or the like during manufacture of these parts.

In accordance with the compositional aspects of repair alloys, suitable repair alloys will have the following constituent ranges: from about 94.55% to about 95.75% nickel; from about 0.45% to about 0.75% boron; from about 2.0% to about 2.4% silicon; and from about 1.8% to about 2.1% phosphorous. These alloys are useful as repair alloys and have hardnesses in the range of from about 13 to about 21 on the Rockwell C scale.

Particularly preferred compositions include a first compositional embodiment which has a Rockwell C hardness of typically from about 16 to 21 and preferably about 18. This embodiment typically includes from about 0.65%–0.95%, and preferably about 0.85% boron; typically from about 2.0% to about 2.4% and preferably about 2.2% silicon; and typically from about 1.8% to 2 1% and preferably about 1.9% phosphorous; with the remainder being nickel.

In a second preferred compositional embodiment a slightly lower hardness typically from about 13-18 and preferably about 15 is provided. A composition of this embodiment may be utilized wherein the boron content is typically from about 0.45% to about 0.75% and preferably 0.55%, the silicon content is typically from about 2.0% to 2.4% and preferably 2.2%, and the phosphorous content is typically from about 1.8% to 2.1% and preferably 1.9%.

In accordance with an original equipment surfacing alloy class of compositions of the present invention, the hardness may range anywhere from 22 to about 33 on the Rockwell C scale. This class of compositions typically includes the following range of constituents: from about 91.85% to about 95.0% nickel; from about 0.85% to about 1.20% boron; from about 2.3% to about 3.85% silicon; and from about 1.8% to about 2.15% phosphorous.

Typical compositions in a first embodiment of this class have Rockwell C hardnesses of from about 22 to 27 with a preferred hardness of 25. In this first embodiment the composition has the following constituents: boron is utilized in amounts of typically from about 0.9% to about 1.2% and preferably at about 1.0%; silicon is utilized in amounts of typically from about 2.3% to about 2.7% and preferably about 2.5%; phosphorous is utilized in amounts of typically from about 1.8% to about 2.1% and preferably about 1.9%; and the remainder is nickel. In a preferred embodiment this composition has a Rockwell C hardness of about 25.

In a second embodiment of the harder alloy compositions of the present invention. A preferred composition includes: a boron concentration of typically from about 0.85% to 1.15% and preferably about 1.0%; a silicon concentration of typically from about 3.45% to about 3.85% and preferably about 3.7%; a phosphorous compositional content of typically from about 1.85% to about 2.15% and preferably about 1.95%; and the remainder being nickel. Such a composition has a Rockwell C hardness of typically from about 28-33 and preferably about 30.5.

The compositions produced in accordance with the present invention have a multiple phase melting property wherein four melt phases are obtained. The first melt phase of about 1,540° F. and the second melt phase of about 1,630° F. give the present surfacing alloys a relatively low initial melting temperature which provides improved wetting of a cold substrate surface. A third melt phase occurs at about 1,750° F. and a fourth melt phase occurs at about 2,235° F. Thus, the present alloy differs from mos surfacing alloys which generally have only two melting phases which are higher than the lowest temperature melting phase of the present invention.

In accordance with the method aspects of the present invention such surfacing alloys may be braze bonded to any number of desirable substrates by thermal spray powder torches or the like. The alloys of the present invention are particularly suitable for repair or surface coating of aluminum bronze 300 alloys which are commonly used in the glass manufacturing industries. However, surfacing alloys of the present invention are also suitable for bonding to other substrates such as cast iron, carbon steel, stainless steel and nickel.

Referring to FIG. 1, there is shown a typical finishing bottle glass mould 10 which has a surfacing alloy layer 12 of the present invention braze bonded to an aluminum bronze substrate 11. Typical constructions of such glass mould parts are made of an aluminum bronze material. FIG. 2 is a photograph of the surfacing alloy 12.

Referring now to FIG. 2, it will be readily appreciated by those skilled in the art that these alloys produce non-porous well leveled surfaces when braze bonded to aluminum bronze substrates.

The surfacing alloy coatings of the present invention have a novel structure as follows. The surfacing alloy composition 12 includes three major phases and one minor phase. The major phases include a primary dendrite phase 14, a black (etched) interdendritic phase 16 which is granular in nature and a lighter appearing interdendritic phase 18. A lesser, lighter appearing interdendritic phase 20, which is eutectic in nature, is also notable in the surfacing alloys of the present invention. A typical chemistry of each of these phases is set forth in Table A below.

TABLE A

| Phase No. | Average Weight % | | | | Melting Temp. |
|---|---|---|---|---|---|
| | Boron | Si | P | Ni | |
| 14 | 1.3 | 2.7 | 0.2 | Rem | 2,235° F. |
| 16 | 3.75 | 0.2 | 0.7 | Rem | 1,750° F. |
| 18 | 0.3 | 4.85 | 11.11 | Rem | 1,540° F. |
| 20 | 0.2 | 0.8 | 11.63 | Rem | 1,630° F. |

While the above chemistry is typical of applied surfacing alloys of the present invention, the key to the effectiveness of the present invention lies in the lighter appearing interdendritic phase 18 having a melting point o typically from about 1,520° F. to about 1,560° F. and the lesser lighter appearing eutectic phase 20 having melting temperatures typically from about 1,610° F. to about 1,650° F. These phases comprise the low melting point high phosphorous containing phases of the present invention. These phases carry the prime concentrations of phosphorous ranging from about 9% to about 12% in each of the phase a 18 and 20. These initial low melting 18 and 20 phases provide for initial effective wetting of and bonding to the aluminum bronze substrate 11. This allows good adhesion for the abovementioned alloys therein. Also because of this lower melting phase it is not necessary to heat the substrate to temperatures formerly necessary for surfacing. Alloys of the present invention begin bonding with heated substrates at a temperature of about 1,520° F. whereas prior surfacing alloys required heating of substrates to temperatures of 1,850° F. or more before bonding could occur. This is advantageous in that aluminum bronzes will tend to detrimentally oxidize above temperatures of 1,500° F. Thus, use of alloys of the present invention prevents rapid oxidation of aluminum bronze substrates at this crucial temperature range between 1,500° F. and 1,850° F. Also, both time and energy are saved due to the lower application temperatures.

The black etched phase 16 is a medium temperature melting phase. This phase typically melts at temperatures of from about 1,730° F. to about 1,770° F. The primary dendrite phase 14 is the high melting phase constituent melting typically at temperatures of about 2,205° F. to about 2,255° F.

While these basic phases are present in all of the alloys of the present invention the sizes of each phase will depend on the amount of each of the constituents which are included in a particular embodiment of the alloy. As the alloys range from the lower hardness to the higher hardness alloys the areas of the primary dendrite phase 14 become smaller and areas of the lighter interdendritic phase 18 and the minor eutectic type interdendritic phase 20 become larger. Also increasing is the number of black (etched) phases.

The resulting alloyed surface is non-porous and very smooth. The alloys of the present invention produce substantially boro silicate-free surfacing coatings and are readily workable with conventional tools. Additionally, surfacing alloys of the present invention produce very aesthetically pleasing coatings in appearance.

Surfacing alloys of the present invention are suitable for use as wear surface coatings on glass moulding industry parts such as plungers, guide sleeves, guide rings, finish moulds, preform blanks, baffles, blow heads, funnels and bottom plates. The surfacing alloys of the present invention will also prove beneficial in other applications where high temperature corrosion resistance, good wearability and aesthetics are desired in a surfacing alloy.

Further understanding of the present invention will be had by reference to the following examples which are presented herein for purposes of illustration but not limitation.

EXAMPLE I

An alloy made in accordance with the present invention was accomplished as follows. The constituents set forth in Table I were weighted out to provide a 100 lb. charge as set forth therein.

TABLE I

| Element | Aim % | Charge % | Weight (lbs.) |
|---|---|---|---|
| B | 0.20 | 0.25 | *1.3 lbs. NiB @ 18% B |
| Si | 1.00 | 1.1 | 1.1 |
| P | 0.20 | 0.20 | *1.8 lbs. NiP @ 11% P |
| Ni | Bal | Bal | 95.8 |

*Nicrobraz ® 10 alloy from Wall Colmonoy Corporation, Madison Heights, Michigan

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500.F for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert gas atomization apparatus utilizing a Krupp 4a atomization nozzle. The alloy was atomized at 300-350 psi at the nozzle and a uniform microstructure powder is produced.

EXAMPLE II

An alloy made in accordance with the present invention was accomplished as follows. The constituents set forth in Table II were weighted out to provide a 100 lb. charge as set forth therein.

TABLE II

| Element | Aim % | Charge % | Weight (lbs.) |
|---|---|---|---|
| B | 0.55 | 0.65 | *3.61 lbs. NiB @ 18% B |
| Si | 2.2 | 2.3 | 2.3 |
| P | 1.9 | 1.9 | *17.27 lbs. NiP @ 11% P |
| Ni | Bal | Bal | 76.82 |

*Nicrobraz ® 10 from Wall Colmonoy Corporation

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500° F. for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert ga atomization apparatus utilizing a Krupp 4a atomization nozzle. The alloy was atomized at 300-350 psi at the nozzle and a uniform microstructure powder is produced.

EXAMPLE III

An alloy made in accordance with the present invention was accomplished as follows. The constituents set forth in Table III were weighted out to provide a 100 lb. charge as set forth therein.

TABLE III

| Element | Aim % | Charge % | Weight (lbs.) |
|---|---|---|---|
| B | 0.85 | 0.95 | *5.2 lbs. NiB @ 18% B |
| Si | 2.2 | 2.3 | 2.3 |
| P | 1.9 | 1.9 | *17.27 lbs. NiP @ 11% P |
| Ni | Bal | Bal | 75.23 |

*Nicrobraz ® 10 from Wall Colmonoy Corporation

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500° F. for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert gas atomization apparatus utilizing a Krupp 4a atomization nozzle. The alloy was atomized at 300-350 psi at the nozzle and a uniform microstructure powder is produced.

EXAMPLE IV

An alloy made in accordance with the present invention was accomplished as follows. The constituents set forth in Table IV were weighted out to provide a 100 lb. charge as set forth therein.

TABLE IV

| Element | Aim % | Charge % | Weight (lbs.) |
|---|---|---|---|
| B | 1.00 | 1.10 | *5.55 lbs. NiB @ 18% B |
| Si | 2.50 | 2.60 | 2.60 |
| P | 1.90 | 1.90 | *17.27 lbs. NiP @ 11% P |
| Ni | Bal | Bal | Bal |

*Nicrobraz ® 10 from Wall Colmonoy Corporation

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500° F. for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert gas atomization apparatus utilizing a Krupp 4a atomization nozzle. The alloy was atomized at 300-350 psi at the nozzle and a uniform microstructure powder is produced.

EXAMPLE V

An alloy made in accordance with the present invention was accomplished as follows. The constituents set forth in Table V were weighted out to provide a 100 lb. charge as set forth therein.

TABLE V

| Element | Aim % | Charge % | Weight (lbs.) |
|---|---|---|---|
| B | 1.00 | 1.10 | *5.55 lbs. NiB @ 18% B |
| Si | 3.70 | 3.80 | 3.80 |
| P | 1.95 | 1.95 | *17.73 lbs. NiP @ 11% P |
| NI | Bal | Bal | 73.28 |

*Nicrobraz ® 10 From Wall Colmonoy Corporation

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500° F. for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert gas atomization apparatus utilizing a Krupp 4a atomization nozzle. The alloy was atomized at 300-350 psi at the nozzle and a uniform microstructure powder is produced.

EXAMPLE VI

An alloy made in accordance with the present invention was accomplished as follows. The constituents set forth in Table 6 were weighted out to provide a 100 lb. charge as set forth therein.

TABLE VI

| Element | Aim % | Charge % | Weight (lbs.) |
|---|---|---|---|
| B | 2.0 | 2.15 | *11.9 lbs. NiB @ 18% B |
| Si | 5.0 | 5.2 | 5.2 |
| P | 3.0 | 3.0 | *27.27 lbs. NiP @ 11% P |
| Ni | Bal | Bal | 55.63 |

*Nicrobraz ® 10 from Wall Colmonoy Corporation

A zirconium oxide crucible in an INDUCTOTHERM ® 100 lb. induction melt furnace was charged with a first layer of about ⅓ of the amount of pure nickel. The entire amount of nickel boron was then placed onto the layer of raw nickel. The nickel boron layer was then covered with the remaining amount of nickel. the furnace was heated to a temperature of 2,500° F. for alloying of the metal. Once this melt was accomplished the BNi7 braze alloy was alloyed into the melt. Thereafter, the silicon component was alloyed into the melt. The alloyed melt was thereafter heated to a temperature of 2,550° F. and poured into a rapid solidification inert gas atomization apparatus utilizing a Krupp 4a atomization nozzle. The alloy was atomized at 300-350 psi at the nozzle and a uniform microstructure powder is produced.

While the above description constitutes the preferred embodiments of the present invention it is to be appreciated that the invention is susceptible to modification, variation and change without departing from the proper scope and fair meaning of the accompanying claims.

What is claimed is:

1. A multiple phase alloy composition for wear resistant surfacing of a substrate consisting essentially of:
   from about 0.20 weight % to about 2.0 weight % boron;
   from about 1.0 weight % to about 5.0 weight % silicon; and
   from about 0.5 weight % to about 4.5 weight % phosphorous with the balance being nickel; said alloy composition including a microstructure having a primary dendrite phase, a first granular interdendritic phase; and a second interdendritic phase.

2. The composition of claim 1 wherein the alloy is formed in a powder particle mixture.

3. The composition of claim 2 wherein said powdered particle mixture has particles ranging in size of from about 140 to about 400 mesh.

4. The composition of claim 2 wherein said powdered particle mixture has particle sizes ranging in sizes of from about 170 to about 325 mesh.

5. The compositions of claim 1 having a Rockwell C hardness of from about 13 to a bout 33 when bonded onto a substrate.

6. The composition of claim 1, wherein the etched microstructure of said first granular interdendritic phase appears blackened and said second interdendritic phase appears lighter than said first interdendritic phase.

7. A multiple phase alloy composition for wear resistant surfacing of a substrate consisting essentially of:
   from about 91.85 weight % to about 95.75 weight % nickel;
   from about 0.65 weight % to about 1.15 weight % boron;
   from about 2.0 weight % to about 3.85 weight % silicon; and
   from about 1.8 weight % to about 2.15 weight % phosphorous; wherein said alloy composition includes a microstructure having a primary dendrite phase, a first granular interdendritic phase and a second interdendritic phase which includes a eutectic interdendritic phase.

8. The composition of claim 7 wherein the alloy is formed in a powder particle mixture.

9. The composition of claim 8 wherein said powdered particle mixture has particles ranging in size of from about 140 to about 400 mesh.

10. The composition of claim 8 wherein said powdered particle mixture has particle sizes ranging in sizes of from about 170 to a bout 325 mesh.

11. The composition of claim 7 having a Rockwell C hardness of from about 13 to a bout 33 when bonded onto a substrate.

12. The composition of claim 7, wherein the etched microstructure of said first granular interdendritic phase is blackened and said second interdendritic phase includes an interdendritic phase which is lighter than said first interdendritic phase.

13. A multiple phase surfacing alloy composition for surface repair having a Rockwell C hardness of from about 13 to about 21, said composition consisting essentially of:
   from about 94.55 weight % to about 95.75 weight % nickel;
   from about 0.45 weight % to about 0.95 weight % boron;
   from about 2.0 weight % to about 2.4 weight % silicon; and
   from about 1.8 weight % to about 2.1 weight % phosphorous; wherein said alloy includes in its microstructure a primary dendrite phase, a first interdendritic phase and a second interdendritic phase which includes a eutectic phase.

14. The composition of claim 13 wherein said alloy composition has compositional limits from a bout 0.45 weight % to about 0.75 weight % boron.

15. The composition of claim 13 wherein said alloy composition has compositional limits from about 0.65 weight % to about 0.95 weight % boron.

16. The composition of claim 13 wherein said composition is a powdered particle mixture.

17. The composition of claim 16 wherein said powdered particle mixture ha particles in sizes ranging from about 140 to about 400 mesh.

18. The composition of claim 16 wherein said powdered particle mixture has particles in sizes ranging from about 170 to about 325 mesh.

19. The composition of claim 14 wherein said composition is a powdered particle mixture.

20. The composition of claim 19 wherein said powdered particle mixture has particles in sizes ranging from about 140 to about 400 mesh.

21. The composition of claim 19 wherein said powdered particle mixture ha particles in sizes ranging from about 170 to about 325 mesh.

22. The composition of claim 15 wherein said composition is a powdered particle mixture.

23. The composition of claim 15 wherein said powdered particle mixture has particles in sizes ranging from about 140 to about 400 mesh.

24. The composition of claim 15 wherein said powdered particle mixture has particles in sizes ranging from about 170 to about 325 mesh.

25. The composition of claim 13, wherein the etched microstructure of said first granular interdendritic phase is blackened and said second interdendritic phase includes an interdendritic phase which is lighter than said first interdendritic phase.

26. A multiple phase surfacing alloy composition consisting essentially of:
from about 91.85 weight % to about 95.0 weight % nickel;
from about 0.85 weight % to about 1.20 weight % boron;
from about 2.3 weight % to about 3.85 weight % silicon; and
from about 1.8 weight % to about 2.15 weight % phosphorous; wherein said surfacing alloy includes a microstructure having a primary dendrite phase, a first interdendritic phase and a second interdendritic phase which includes a eutectic phase.

27. The composition of claim 26 wherein said composition has compositional limits from about 0.9 weight % to about 1.20 weight % boron, and from about 2.3 weight % to about 2.7 weight % silicon.

28. The composition of claim 26 wherein said composition has compositional limits from about 0.85 weight % to 1.15 weight % boron, from about 3.45 weight % to about 3.85 weight % silicon, and from about 1.85 weight % to about 2.15 weight % phosphorous.

29. The composition of claim 26 wherein said composition is a powdered particle mixture.

30. The composition of claim 29 wherein said powdered particle mixture has particles in sizes ranging from about 140 to about 400 mesh.

31. The composition of claim 29 wherein said powdered particle mixture has particles in sizes ranging from about 170 to about 325 mesh.

32. The composition of claim 27 wherein said composition is a powdered particle mixture.

33. The composition of claim 32 wherein said powdered particle mixture has particles in sizes ranging from about 140 to about 400 mesh.

34. The composition of claim 32 wherein said powdered particle mixture has particles in sizes ranging from about 170 to about 325 mesh.

35. The composition of claim 28 wherein said composition is a powdered particle mixture.

36. The composition of claim 35 wherein said powdered particle mixture has particles in sizes ranging from bout 140 to about 400 mesh.

37. The composition of claim 35 wherein said powdered particle mixture has particles in sizes ranging from about 170 to about 325 mesh.

38. The composition of claim 26, wherein the etched microstructure of said first granular interdendritic phase is blackened and said second interdendritic phase includes an interdendritic phase which is lighter than said first interdendritic phase.

39. A surfacing alloy composition for wear resistant surfacing of a substrate consisting essentially of:
from about 0.20 weight % to about 2.0 weight % boron;
from about 1.0 weight % to about 5.0 weight % silicon;
from about 0.5 weight % to about 4.5 weight % phosphorous;
with the balance being nickel, wherein said surfacing alloy comprises in its microstructure a primary dendrite phase having a melting temperature for from about 2,205° F. to about 2,255° F.; a first granular interdendritic phase having a melting temperature of from about 1,730° F. to about 1,770° F.; a second interdendritic phase having a melting temperature of from about 1,520° F. to a bout 1,560° F. and an eutectic interdendritic phase having a melting temperature of from about 1,610° F. to about 1,650° F.

40. The composition of claim 39 wherein the surfacing alloy is formed in a powder particle mixture.

41. The composition of claim 39 wherein said powdered particle mixture has particles ranging in size of from about 140 to about 400 mesh.

42. The composition of claim 39 wherein said powdered particle mixture has particle sizes ranging in sizes of from about 170 to about 325 mesh.

43. The composition of claim 39, wherein said surfacing alloy has a Rockwell C hardness of from about 13 to about 33 when bonded on to a substrate.

44. The composition of claim 39, wherein the etched microstructure of said first granular interdendritic phase is blackened and said second interdendritic phase includes an interdendritic phase which is lighter than said first interdendritic phase.

* * * * *

UNITED STATES PATENT AND TRADEMARK OFFICE
CERTIFICATE OF CORRECTION

PATENT NO. : 5,234,510  
DATED : August 15, 1994  
INVENTOR(S) : Samuel C. Dubois Page 1 of 3

It is certified that error appears in the above-indentified patent and that said Letters Patent is hereby corrected as shown below:

ON THE TITLE PAGE, "NICROBRAZ® Techmical" should be --NICROBRAZ® Technical--.

Column 4, Line 29, "2 1%" should be --2.1--

Column 4, Line 68, "1.95%:" should be --1.95%;--

Column 5, Line 13, "mos" should be --most--

Column 5, Line 61, after "point" delete "o" and insert --of-- therefor

Column 5, Line 68, "phase a" should be --phases--

Column 7, Line 3, "5/8" should be --1/3--

Column 7, Line 6, "the" should be --The--

Column 7, Line 33, "5/8" should be --1/3--

Column 7, Line 36, "the" should be --The--

Column 7, Line 42, "ga" should be --gas--

Column 7, Line 63, "5/8" should be --1/3--

Column 7, Line 66, "the " should be --The--

Column 8, Line 26, "5/8" should be --1/3--

Column 8, Line 29, "the should be --The--

Column 8, Line 52, Table V, "NI" should be --Ni--

UNITED STATES PATENT AND TRADEMARK OFFICE
CERTIFICATE OF CORRECTION

PATENT NO. : 5,234,510
DATED : August 15, 1994
INVENTOR(S) : Samuel C. Dubois

It is certified that error appears in the above-indentified patent and that said Letters Patent is hereby corrected as shown below:

Column 8, Line 57, "5/8" should be --1/3--

Column 8, Line 60, "the" should be --The--

Column 9, Line 17, ".in" should be --in--

Column 9, Line 19, "5/8" should be --1/3--

Column 9, Line 22, "the" should be --The--

Column 10, Line 21, "a bout" should be --about--

Column 10, Line 23, "a bout" should be --about-

Column 10, Line 46, "a bout" should be --about--

Column 10, Line 54, "ha" should be --has--

Column 10, Line 65, "ha" should be --has--

Column 12, Line 5, "bout" should be --about--

Column 12, Line 24, "for" should be --of--

UNITED STATES PATENT AND TRADEMARK OFFICE
CERTIFICATE OF CORRECTION

PATENT NO. : 5,234,510
DATED : August 15, 1994
INVENTOR(S) : Samuel C. Dubois

It is certified that error appears in the above-indentified patent and that said Letters Patent is hereby corrected as shown below:

Column 12, line 29, "a bout" should be —about—

Signed and Sealed this

Fourteenth Day of March, 1995

Attest:

BRUCE LEHMAN

Attesting Officer

Commissioner of Patents and Trademarks